United States Patent [19]

Ashmead

[11] 4,201,793
[45] May 6, 1980

[54] OIL COOKED FOODS CONTAINING METAL PROTEINATES

[76] Inventor: Harvey H. Ashmead, 719 E. Center St., Kaysville, Utah 84037

[21] Appl. No.: 743,456

[22] Filed: Nov. 19, 1976

[51] Int. Cl.$^2$ ............................................. A23L 3/34
[52] U.S. Cl. .................... 426/92; 426/271; 426/648; 426/656; 426/544; 426/610; 426/549; 426/637
[58] Field of Search ............... 426/74, 648, 649, 656, 426/271, 544, 610, 92, 549, 637; 260/112 R, 113, 115

[56] References Cited

U.S. PATENT DOCUMENTS

| | | | |
|---|---|---|---|
| 505,986 | 10/1893 | Marfori et al. | 260/115 |
| 2,295,643 | 9/1942 | Emery et al. | 426/656 X |
| 2,481,412 | 9/1949 | Grindrod | 426/74 X |
| 2,710,858 | 6/1955 | Block et al. | 260/115 X |
| 3,396,104 | 8/1968 | Miller | 260/112 R |
| 3,775,132 | 11/1973 | Richards | 426/656 |
| 3,823,127 | 7/1974 | Jones et al. | 260/112 R |
| 3,969,540 | 7/1976 | Jensen | 426/648 X |

OTHER PUBLICATIONS

Fabricated Foods, Edited by Inglett, 1975, The AVI Publishing Co., Inc., pp. 207–212.
Handbook of Food Additives, Edited by Furia, 1968, The Chemical Rubber Co., pp. 289–300.

*Primary Examiner*—Joseph M. Golian
*Attorney, Agent, or Firm*—Criddle & Western

[57] ABSTRACT

Deep fried foods such as potato chips, french fries, pork rinds, corn chips, and the like are cooked in oils containing a metal proteinate or a mixture of metal proteinates. The life of the oil is extended and rancidity is inhibited.

18 Claims, No Drawings

OIL COOKED FOODS CONTAINING METAL PROTEINATES

BACKGROUND OF THE INVENTION

With the advent of the "quick foods" industry foods such as potato chips, french fries, fish and chips, fried shrimp, fried onions and many other foods that are deep fried with or without a batter there has arisen a need to protect the cooking oil from becoming rancid and to also fortify the foods cooked in said oils with essential minerals and protect them from becoming rancid. Various formulations of metal salts are used to both fortify and improve the taste of such foods. For example federal regulations require that iron used for the enrichment of foods be in a form that is safe and assimilable. The iron should also be non-magnetic and have excellent stability with the foods with which it is combined.

The changes in aroma from fresh to rancid or stale odors are readily detectable by most observers and such changes should be inhibited or at least slowed down by the usage of bio-available additives which are also beneficial to the body. For example when iron sulfate and other inorganic salts are added to cooking oils (hydrogenated vegetables and animal cooking oils) they readily develop a sharp rancid aroma which is objectable to both the oil and the product produced by the oil. Moreover, such additives are not readily assimilated by the body.

OBJECTS OF THE INVENTION

It is an object of the present invention to provide foods cooked in a hot oil bath containing stable metal proteinates.

It is also an object of this invention to provide foods cooked in a hot oil bath wherein the metal proteinates are absorbed into the food being cooked.

A further object of this invention is to prolong the life of the oil bath and the foods cooked therein.

These and other objects will become apparent from a detailed description of the invention which follows.

DETAILED DESCRIPTION OF THE INVENTION

Foods such as potato chips and the like are often cooked in large pots or vats containing hot oil. These foods in their uncooked form may contain a high percentage of moisture which is expelled into the surrounding atmosphere and the cooking oil is absorbed into the food. Sometimes a batter is used around the food as in corn dogs, shrimp, fish and chicken and then "deep fried" in oil. Whatever the result, the moisture is displaced by the cooking oil. Any additives to the cooking oil will also be absorbed into the batter, potato or any other ingredient being deep fried.

By fortifying the cooking oil with proper amount of metal proteinates these metal proteinates will be absorbed into the material being cooked and prolong the life of the oil as well as the product.

A metal proteinate is a chelate of an essential bivalent metal such as iron, zinc, copper, cobalt, manganese, magnesium and calcium with at least two ligands which are amino acids, peptides or polypeptides, all of which are hydrolysis products or proteins. The shorter the chain length of the ligand the stronger the chelation bond will be. As used herein the term proteinate and chelate may be used interchangeably.

Protein hydrolysates are prepared by acidic, basic or enzymatic hydrolysis. It is beneficial to first hydrolyze a protein source well so that the subsequent formation of the metal proteinate or chelate can form a product that can be actively transported through the walls of the small intestine. Large protein entities such as metal salts of gelatinates, caseinates or albuminates must be digested before transport can take place. It is believed that unhydrolyzed protein salts, in general, pass through the intestine largely intact with only small amounts being utilized. Therefore, in the present invention the protein molecules are hydrolyzed to a polypeptide, peptide or amino acid stage prior to mixing with the metal salt to form a proteinate (chelate with at least two protein hydrolysates as the liquid). In order to form a metal proteinate the proper amounts of constituents must be present at the right conditions. The mineral to be chelated must be in soluble form and the protein hydrolysates or amino acids must be free from interfering protons, i.e., non-intact, in the chelation process so that chemical bonds can be formed between the protein ligand and the metal involved. Since chelates, by definition, are molecular structures in which a heterocyclic ring can be formed by the unshared electrons of neighboring atoms, it is essential that before a protein hydrolysate can complex with a metal ion to form coordinate bonds, that the protons in the chelating agent, i.e., the amino acid or protein hydrolysate, be removed. Again, by definition, a chelating agent is considered to be an organic compound in which molecules form more than one coordinate bonds with metals in solution. Thus it is essential that the chelation process take place in solution. Once the chelating mineral salt is completely soluble and the protein hydrolysates are sufficiently soluble to react the pH must be adjusted to a point that is basic enough to remove interfering proton from both the amine groups and the carboxyl groups. While a pH of 7.5 may be sufficient, a pH in the range of 8–10 is preferred. This allows the heterocyclic rings to form bonds between the metal and the lone pairs of electrons left behind on the amine groups. Thus, the mere mixing of intact amino acids or intact protein hydrolysates with water in the presence of a metal salt will not result in a chelate or proteinate because the protons on the carboxyl and amine groups interfere with chelate formation. When combining protonated or intact protein or protein hydrolysates with a soluble metal salt either no reaction takes place or a salt may be formed from the metal with the protein or protein hydrolysate, which salt may be soluble or may precipitate. The metal proteinates formed as described and used herein precipitate in basic solutions and are insoluble or only partially soluble in water solutions. Moreover, metal proteinates or chelates are heterocyclic complexes and are vastly different from metal salts of proteins or amino acids. The metal proteinates more readily assimilated and ingested through the small intestine making the metal more readily available to the body tissues.

The products of the invention are stable and provide proper fortification of metal proteinates into the products into which they are incorporated. The concentration of metal proteinate in the product will depend upon the concentration of metal proteinate in the cooking oil. The absorptive capacity of the metal proteinates onto the foods is substantially proportionate to the concentration of the metals in the oil and the amount of the oil that penetrates into the cooked food. Concentrations may vary depending upon the metal proteinate or the mixture of proteinates desired. Also the end product may have a lesser propensity for the metal proteinate than the cooking oil. Concentrations may be determined empirically and will depend somewhat upon the recommended daily allowance for each metal. Generally concentrations will vary from about 0.2 to 2 grams of metal (without considering the ligand) per gallon of cooking oil. The resulting deep fried products will contain sufficient metal proteinates to inhibit the onset of rancidity and also to supply a biologically effective amount of essential minerals to the body when the products are ingested.

The metal proteinates may be added in several ways. For example, the amount of metal protein being absorbed could be determined by the analysis of cooking oil with metal proteinates being added as needed. The metal proteinates are precipitates and are substantially insoluble in the cooking oil. Therefore, the oil should be continuously agitated or stirred in order to keep the metal proteinates from settling to the bottom of the container or vat. Conventional types of stirrers may be used depending upon the size and capacity of the cooker. It is to be understood that the metal proteinates may be added containing a single metal or predetermined mixture of metals.

The efficacy of using metal proteinates over metal salts in providing the body with essential metals is well known; however, such metal proteinates have usually been taken in the form of a compressed pill or tablet and ingested separately as a dietary mineral supplement.

It is important from a medical and/or dietary viewpoint that the essential metals be absorbed into the bloodstream and distributed to various parts of the body as needed. Metal salts are ionic and dissociate in the stomach into their various cations and anions. Since the lining of the intestine contains electrical charges these ions pass through the body being largely unabsorbed. On the other hand chelates formed from such ligands as EDTA (ethylenediaminetetraacetic acid) and its salts so tightly bind the metal that it is not made available to the body for assimilation into the body.

Metal chelates are formed from naturally occurring amino acids or from hydrolyzed protein sources such as fish meal soya or other edible protein sources. These protein hydrolysates are thus comprised of polypeptides, peptides and naturally occurring amino acids hereinafter referred to as ligands. The ligands, at least two or more, bind and protect the metal. Since there is no net electrical charge on the metal proteinate, it readily passes through the intestinal wall and into the bloodstream where the proteinate is broken apart and the metal is distributed as needed to the various parts of the body.

The fact that the metal proteinate helps prevent rancidity of the cooking oil is also an important feature of this invention by increasing the shelf life and/or cooking life of the oil. This is economically beneficial and cuts down on the use of oil as well as imparting to the cooked product an essential mineral.

In general the stability of the metal proteinates increase as the oxidation state of the metal increases. Also, the shorter chain ligands produce stronger proteinates, hence amino acids are preferred over peptides which are preferred over polypeptides as ligands.

The coordination number of the metal may be quite different from the valence and tells how many coordinate ligands a metal ion may have. Using iron as an example the coordination number may vary from two to eight although other numbers are also known. The ferrous ion may have four waters of hydration. Since most metals have coordination numbers of from two to eight their ions become incased with hydration shells made up of electronegative water molecules wherein the oxygen atoms of each water molecule is attached to the positively charged metal ion. In general, from two to eight ligands may be provided for each metal ion. Sufficient ligands should be present to allow complete chelation to take place.

Every bond between the metal and the oxygen atom of the water molecule consist of two electrons. The water molecules are said to be coordinated to the metal because the oxygen atom contributes both electrons that make up the coordination covalent or simply covalent bonds.

A complex is formed when a substance other than water forms a coordinate or covalent bond. A chelate may be a complex but not all complexes are chelates. Oxygen and nitrogen are electronegative elements that contribute electron pairs to form covalent bonds. Because of their structure amino acids, peptides and polypeptides are important ligands. A ligand may refer to the part of a molecule which contains these negatively charged elements and is the site where complex formation occurs. Ligand is also used to designate the metal binding molecules themselves. As used in this application the term chelate or proteinate refers to a metal containing at least two ligands. When a metal proteinate has two or more ligands it may be referred to as a bi-, tri-, quadri-, quinque-, a sexadentate proteinate, etc. A metal proteinate is a complex containing two or more heterocyclic rings. The term "chelation", therefore refers to a particular kind of metal binding where the amino acid function of the molecule is clamped onto the metal at two or more sites, thus producing the heterocyclic ring. Obviously a metal cannot form a coordination complex with an intact amino acid. Therefore it is important to metal chelate formation that the interfering protons be removed from the carboxyl and amino groups before chelation can take place.

To form a metal proteinate the coordinated water molecules will be replaced by the ligand.

Chelates differ from salts and other complexes due to their closed ring structure in which the metals are tightly held. Generally five membered chelate rings are most stable. It is to be remembered that while covalent bonds are most stable and are preferred some ionic bonding may be formed in each chelate. The transition metals more readily from covalent bonds while alkaline earth metals may form some ionic bonds.

Stability constants may be determined by polorography wherein it is shown the chelates are of the magnitude of $10^3$ to $10^7$ times more stable than the corresponding salts or complexes.

When forming a metal proteinate the pH of the solution drops upon the addition of the ligand. It is important that the protons on the ligand be removed so that they do not interfere with chelate formation by competing with the metal ion.

Using glycine, the simplist amino acid, as a model and zinc as the metal ion containing four waters of hydration the reaction would be as follows.

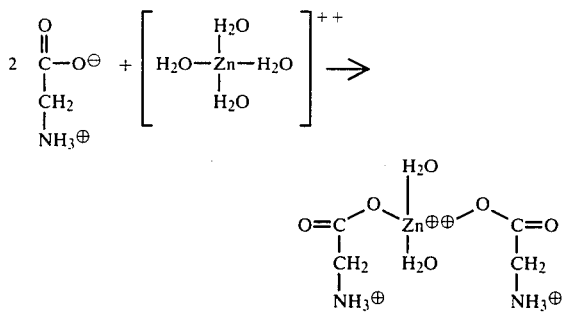

Thus a complex is formed which may or may not be soluble in the aqueous reaction media. Upon the addition of more base such as NaOH the product becomes

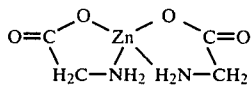

This represents a true metal proteinate wherein all of the protons on the ligand have been removed and thus heterocyclic rings have been formed. Note that each ring has five members which are found to be most stable. From the above it is imperative that the ligand protons be removed and full chelation be carried out under basic reaction conditions.

The chelates, when formed precipitate and are stable ready to be incorporated into the oil. As previously mentioned the proteinates are relatively insoluble in the oil and therefore a mixing action must take place to keep the proteinates from falling to the bottom of the container. Both a vegetable and animal oils may be used. Typical of such oils are corn, palm, coconut, peanut, and safflower oils and rendered animal fats both hydrogenated and non-hydrogenated. The oil may be used to cook any of the conventionally "deep fried" products such as potato chips, french fries, corn chips, corn dogs, pastries such as donuts and batter covered deep fried meats such as chicken and shrimp.

The following examples are for illustration only and do not limit the disclosed invention.

EXAMPLE I

Into a vat equipped with a stirrer containing a mixture of hydrogenated palm and coconut oils maintained at 375° F. is added a mixture of iron, zinc and copper proteinates containing about 1.5 grams of zinc, 1.8 grams of iron, and 0.2 grams of copper per gallon of oil. Potatoes sliced on a commercial potato chip slicer are cooked in the hot oil until crisp and a light golden brown whereupon the cooked potato chips are removed from the oil and allowed to drain. Upon analysis the chips are found to contain 6.0 mg. of zinc, 7.2 mg. of iron and 0.8 mg. of copper in the form of proteinates per 2 ounce serving of potato chips.

EXAMPLE II

The procedure of Example I is followed using an iron proteinate only. The oil used is safflower oil containing about 2.0 grams of iron in the proteinate form per gallon of oil. Results similar to Example I are obtained which upon analysis show a product containing about 8 mg. of iron as a proteinate per 2 ounce serving.

EXAMPLE II

Into a small container equipped with a stirrer containing hydrogenated corn oil is added a mixture of iron magnesium and zinc proteinates in an amount sufficient to provide 1.5 grams of iron, 0.5 grams of magnesium and 1.2 grams of zinc per gallon of oil. The oil is maintained at a temperature of about 400° F. and is constantly agitated. A yeast leavened donut dough is cooked in the hot oil until done and the donuts are allowed to drain. Upon analysis it is shown that the donuts contained about 9.7 mg. of iron, 3.2 mg. of magnesium and 7.8 mg. of zinc for 4 ounce serving.

EXAMPLE IV

Into a vat that constantly strains and recirculates the oil is added a mixture of iron, manganese, copper, and calcium proteinates in an amount sufficient to provide about 0.5 gram of each metal in the form of a proteinate in the oil. The oil is maintained at a temperature of about 325°–350°. Chicken legs are dipped in a batter and placed in the oil until cooked and are then removed and allowed to drain. Upon analysis it is shown that the proteinates are absorbed onto the surface of the batter in an amount of which is approximately proportionate to the concentration of the proteinates in the cooking oil.

The above examples are but indicative of the present invention which is to be limited only by the appended claims.

I claim:

1. A cooking oil containing a stabilizing amount of at least one metal proteinate wherein said metal proteinate is a chelate of a metal with at least two ligands which ligands are protein hydrolysates consisting of polypeptides, peptides and amino acids.

2. A cooking oil according to claim 1 wherein the metal proteinates are selected from the group consisting of iron, zinc, copper, cobalt, manganese, magnesium and calcium proteinates.

3. A cooking oil according to claim 2 wherein the metal content of each metal in the metal proteinate may vary from about 0.2 to 2.0 grams per gallon of oil.

4. A cooking oil according to claim 3 wherein the metal proteinate is an iron proteinate.

5. A cooking oil according to claim 3 wherein the metal proteinate is a mixture of two or more different metals.

6. A method of inhibiting rancidity in a cooking oil which comprises adding an inhibiting amount of an essential metal in the form of a metal proteinate to the cooking oil wherein said metal proteinate is the chelate of a metal with at least two ligands which ligands are proteinate hydrolysates consisting of polypeptides, peptides, and naturally occurring amino acids.

7. A method of inhibiting rancidity of cooking oil according to claim 6 wherein the metal proteinates are selected from a group consisting of iron, zinc, copper, cobalt, manganese, magnesium and calcium proteinates.

8. A method of inhibiting rancidity in a cooking oil according to claim 7 wherein the metal content of each metal and the metal proteinate may vary from about 0.2 to 2.0 grams per gallon of oil.

9. An oil cooked edible food containing an effective amount of an essential metal in the form of a metal proteinate wherein said metal proteinate is absorbed onto said food from the cooking oil wherein said metal proteinate is a chelate of a metal ion with at least two ligands which ligands are protein hydrolysates consisting of polypeptides, peptides, and naturally occurring amino acids.

10. An oil cooked edible food according to claim 9 wherein metal proteinates are selected from the group consisting of iron, zinc, copper, cobalt, manganese, magnesium and calcium proteinates.

11. An oil cooked edible food according to claim 10 wherein the cooking oil contains about 0.2 to 2 grams of metal per gallon and the effective amount of metal chelate in the food will be approximately proportionate to the concentration of the metal proteinate in the oil absorbed by the food.

12. An edible food according to claim 11 wherein the food is potato chips.

13. An edible food according to claim 11 wherein the food is french fries.

14. An edible food according to claim 11 wherein the food is a pastry.

15. An edible food according to claim 11 wherein the food is a batter covered meat product.

16. A method of inhibiting rancidity in oil cooked foods which comprises cooking said foods in an oil containing an inhibiting amount of a metal proteinate wherein said metal proteinate is a chelate of an essential metal with at least two ligands which ligands are protein hydrolysates consisting of polypeptides, peptides, and naturally occurring amino acids.

17. A method of inhibiting rancidity in oil cooked foods according to claim 16 wherein the metal proteinates are selected from the group consisting of iron, zinc, copper, cobalt, manganese, magnesium and calcium proteinates.

18. A method of inhibiting rancidity in oil cooked foods according to claim 17 wherein the foods are cooked in an oil having a metal content of from 0.2 to 2.0 grams per gallon of oil.

* * * * *